Feb. 24, 1931. A. H. TARLETON 1,793,877
METHOD OF PLANT CULTURE
Filed July 18, 1927
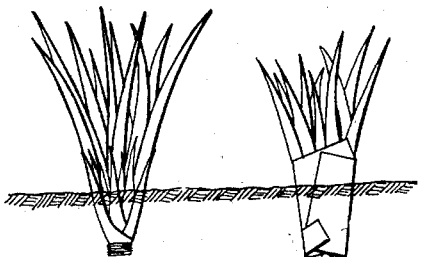
Fig. 4
Fig. 5
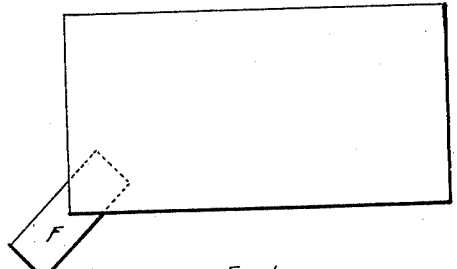
Fig 1
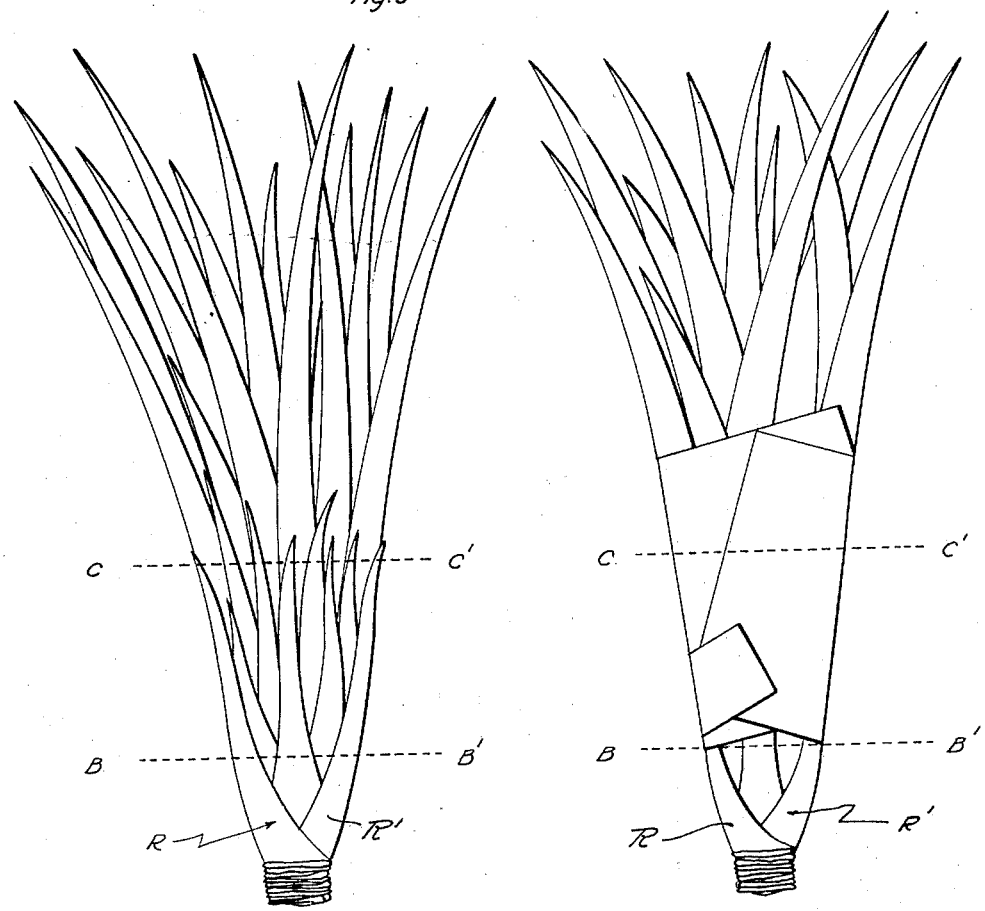
Fig. 2
Fig 3
Witnesses
Charles Dudley Pratt
Louis John Warren
Albert Henry Tarleton
Inventor
by Chapin & Neal
Attorneys.

Patented Feb. 24, 1931

1,793,877

UNITED STATES PATENT OFFICE

ALBERT HENRY TARLETON, OF HONOLULU, TERRITORY OF HAWAII

METHOD OF PLANT CULTURE

Application filed July 18, 1927. Serial No. 206,584.

This invention relates to methods of enhancing the growth and productivity of pineapple and other cultivated plants, by means of encasement of the plant stock in a sleeve or wrapper and imbedding the same in the soil deeper than the planting depth otherwise usual or practicable, all as hereinbelow described, and has for its objects:

(1) The production of a deeper, usual or natural root system on the plant stock, by deeper planting than is otherwise usual or practicable;

(2) The production of an additional system on the plant stock, by inducing the growth of additional or adventitious roots on the soil-imbedded portion of the plant stock in the sleeve or wrapper above the usual rooting area;

(3) The stimulation and protection of the plant by utilization of the sleeve or wrapper for the reception and retention, by impregnation or deposit, of fertilizers, insecticides and fungicides, in close proximity to the plant;

(4) The protection of the plant from injury by the application of fertilizers, insecticides, fungicides or soil-correcting formulae to the surrounding soil of such strength as would injure the plant by direct contact therewith;

(5) The protection of the plant from accretive invasion of wind or water driven soil, and protection of the root system from exposure through the removal of soil by the erosive effect of wind or water;

(6) The protection of the root system of the plant from the deterrent effects of weeds during the tender stages of development;

(7) The stimulation of the plant by utilization of the sleeve or wrapper as a conservator of moisture;

(8) The stimulation of the plant by an induced humidity and warmth within the sleeve or wrapper.

Fig. 1 shows a suitable wrapper with sealing flap;

Fig. 2 shows a pineapple plant without wrapper;

Fig. 3 illustrates the same plant with the wrapper;

Fig. 4 depicts a pineapple plant in its usual planting position; and

Fig. 5 illustrates the positioning of a wrapped plant.

The invention consists of the encasement of the stock of an infant plant, whether in the form of suckers, slips, stems, stalks, crowns or cuttings, in a sleeve, sheath or wrapper of any suitable material, preferably paper, of any desired thickness, texture or composition, and preferably more or less soft and absorbent in character, in such manner as to expose at the lower end only the usual rooting area of the plant stock and so as to expose the upper portion of the plant stock above the wrapper, substantially as shown by Fig. 3 of the accompanying drawing, and then planting the sheathed plant stock several inches deeper in the soil than is otherwise usual or practicable, the proportional increase of planting depth depending upon the character and size of the plant, preferably leaving the upper portion of the sleeve or wrapper projecting above the surface of the ground.

The plant wrapper may be used in a fixed form, as a sleeve, decapitated cone or sheath, held in shape by pasting or otherwise fastening the outer overlapping edge, or by a binder or flap pasted or otherwise temporarily fastened around the sheath or across the outer edge, or it may be merely wrapped around the plant and held in the covering position until inserted in and surrounded by the soil.

The wrapper may be of any desired size or shape, and be of any desired material, preferably paper, as long as it serves the purpose, after the setting in soil of the plant stock, of providing a snug contact with the plant stock sufficient to screen from sunlight that portion of the plant stock on which the adventitious root-system is to be provoked.

In the accompanying drawing Fig. 1 shows a sheet of wrapping paper, with a seal flap F attached, suitable for use in snugly wrapping the plant stock as described. Fig. 2 shows an uncovered pineapple slip or sucker in condition as usually planted as infant stock of a new plant individual, from which it will be seen that the base or area of the usual root system, marked R and R' is comparatively small and is evolved only from the extreme base of the stock.

Fig. 3 shows the pineapple plant stock encased or wrapped and ready for insertion in the ground to the depth marked by the dotted line C—C' which it will be noted is several inches above the dotted line B—B' which marks the usual planting depth of a pineapple sucker or slip. The same dotted lines B—B' and C—C' are extended across the bare figure of a like pineapple sucker or slip, shown in Fig. 2. These dotted lines mark off between them the area of the plant stock upon which the additional root system is capable of being developed.

Fig. 4 shows a pineapple infant stock as imbedded in the soil to the usual planting depth and by the usual method. Fig. 5 shows a pineapple stock encased in the sleeve or wrapper imbedded deeper in the soil, in the improved method herein described.

By this method the usual root-system area of the plant stock will be so deeply imbedded as to establish the primary root system with its spread in soil at a depth having a more constant and even moisture and temperature than obtainable nearer the surface of the ground, the deeper root system inducing an early development and sturdy growth and strength of the plant and rendering it more capable of producing larger and better fruit and multiple crops.

The sleeve or wrapper will protect the imbedded tender portion of the plant stock from decay or other injury by soil contact, which portion cannot ordinarily be subjected to the effect of soil contact, and will, by screening off the sunlight and by affording natural humidity and warmth, induce the development upon this encased imbedded portion of the plant stock, above its usual root system area, of an adventitious root system extending several inches up and down the plant stock, from which the roots will tend to range downward, giving them a greater depth before spreading. By the time the adventitious roots will have developed sufficiently for projection the sleeve or wrapping will have so distintegrated as to permit them to penetrate the wrapper and enter the surrounding soil. The plant will then have a combined or augmented root system considerably in excess of that obtainable by the usual planting methods, which will induce a more vigorous growth and sturdy strength of the plant and render it more capable of producing larger and better fruit and multiple crops.

Since the roots stems of weeds are ordinarily near the surface of the ground, the deterrent effect of weeds upon the growth of a plant is ordinarily greater when the plant roots are near the surface. By the planting method herein described the original or natural root system area of the plant will be developed below the worst sphere of influence of weed roots, and be comparatively free therefrom, thereby affording more rapid development of the lower root system. During the tender state of development of additional roots upon the upper or encased imbedded portion of the plant stock these roots will be protected, by the sleeve or wrapper, from encroachment by weed roots, until the additional root system shall become weed-resistant, so that the usual retardation of plant growth by weeds where the roots are near the surface of the ground will be substantially or entirely eliminated. By the time the upper root system will have attained independent vigor the natural outspread of the plant above the ground will ordinarily due to the sturdier development of the usual root-system, have shaded out and overborne the vigor of any weeds in close proximity.

The sleeve or wrapper may be impregnated or coated with any desired formulae of fertilizing ingredients or insecticidal or fungicidal substances, or it may be used as a receptacle for the deposit and retention within itself of any such ingredients or substances. In this case a more loosely laying of the wrapper about the plant stock will be preferable in order to leave sufficient voids for receiving such ingredients. The projection of the sleeve or wrapper above the surface of the ground will better serve this purpose. These ingredients or substances, by being thus held in close and protected proximity to the plant, will not leach or dry out or become dissipated as readily as if openly exposed to wind or solar heat or other action of the elements. They may also be milder in composition or in more diluted form or less in quantity than if applied to the surrounding soil. Deeper planting is preferable although not indispensable. It is therefore obvious that the use of the sleeve or wrapper for any of these purposes will afford a comparatively maximum efficiency with a minimum waste of the ingredients or substances used, and effect their purposes with a material saving of cost in protecting and stimulating the plant growth. The sleeve or wrapper, by holding fertilizing substances in close proximity to the plant, will prevent them from contributing materially to weed stimulation.

It will also be noted that by allowing the sleeve or wrapper to project well above the surface of the ground, (C—C'), as shown by Fig. 3, this projected portion of the sleeve or wrapper will better serve to permit the application to the surrounding surface soil of fertilizers, insecticides or fungicides of such strength as would be harmful to the plant if allowed to come into direct contact therewith.

In soils containing humus material and for such or any other reason apt to be sour, the sleeve or wrapper will protect the additional root system of the plant from acidual effects which might otherwise have a deterrent effect upon the plant, especially in the tender stage of development.

Where strong treatment of the surrounding soil may be necessary to correct or neutralize acidity, sourness or harmful bacterial conditions, such treatment could be applied thereto without the same coming into direct contact with the plant within the protective sphere of the sleeve or wrapper, and with better effect if the sleeve or wrapper projects above the surface of the ground.

The sleeve or wrapper will also protect the upper root system from exposure through the possible removal of soil by action of the elements, and it will also protect the plant itself from invasion by accretions of windblown or water-washed soil.

The sleeve or wrapper, both above and below the surface of the ground, will serve as an absorbent conservator of moisture, while permitting any over-saturation to drain through to the lower root system, and so contribute materially to the uniform growth and strength of the plant. It will further induce a natural warmth and humidity beneficial to the plant within the encased imbedded portion.

Although the foregoing description of carrying out the method or process of using said invention is particularly stated with reference to pineapple plants, it is equally adaptable to the planting of other infant plant stocks in the form of slips, suckers, stalks, crowns or cuttings to be inserted in the ground, and I wish to be understood as claiming the invention in connection with any and all such plants.

I claim:

1. A method of enhancing plant growth and productivity which comprises encasing the plant stock in a wrapper in snug contact therewith having open ends and extending above the normal root-system area of the plant stock, and embedding the plant stock and wrapper in soil to a depth greater than that of the normal root-system area of the stock, whereby an artificial adventitious subsurface root-system will be provoked in the shelter of the wrapper.

2. A method of enhancing plant growth and productivity which comprises encasing the plant stock in an open-ended wrapper in snug contact therewith, said wrapper covering only a localized area along the stock above the normal root-system area of the stock, and embedding the plant stock and wrapper in soil to a depth greater than that of the normal root-system area of the stock, whereby an artificial adventitious sub-surface root-system will be provoked in the shelter of the wrapper.

3. A method of enhancing plant growth and productivity which comprises encasing the plant stock in an open-ended wrapper in snug contact therewith, said wrapper covering only a localized area along the stock above the normal root-system area of the stock, and embedding the plant stock and wrapper in soil to a depth greater than that of the normal root-system area of the stock but insufficient to completely bury the wrapper, whereby the plant is protected against deleterious influences on the surface of the soil and in the sub-surface region infested by weed roots.

4. A method of enhancing plant growth and productivity which comprises encasing the plant stock in a wrapper in snug contact therewith, said wrapper having open ends and extending above the normal root-system area of the plant stock, embedding the plant stock and wrapper to a depth greater than that of the normal root-system area of the stock, leaving a portion of the wrapper projecting above the soil, and fertilizing the surrounding soil to a degree which would be harmful to the plant in the absence of the wrapper.

5. A method of enhancing plant growth and productivity which comprises wrapping a portion only along the plant stock above its normal root-system area with a wrapper in snug contact with the stock and embedding the plant stock and at least a portion of the wrapper in soil.

6. A method of enhancing plant growth and productivity which comprises wrapping a portion along the plant stock above its normal root-system area with paper in snug contact with the stock, and planting the stock and wrapper in soil with a portion of the wrapper embedded in the soil as a protection against weed roots and a portion of the wrapper extending above the soil as a protection against injurious surface conditions.

7. A method of enhancing plant growth and productivity which comprises laying a wrapper about a portion of the plant stock above and closely adjacent to the natural root-system area of the plant stock, and embedding the plant stock in soil so that only part of the wrapped portion will project above the soil, whereby an artificial adventitious sub-surface root-system will be provoked on the wrapped portion of the plant stock.

ALBERT HENRY TARLETON.